Dec. 20, 1938. J. J. JAKOSKY 2,140,798
ELECTRICAL METHOD AND APPARATUS FOR DETERMINING
THE CHARACTERISTICS OF GEOLOGIC FORMATIONS
Filed July 21, 1936

INVENTOR.
John Jay Jakosky,
BY
ATTORNEYS.

Patented Dec. 20, 1938

2,140,798

UNITED STATES PATENT OFFICE 2,140,798

ELECTRICAL METHOD AND APPARATUS FOR DETERMINING THE CHARACTERISTICS OF GEOLOGIC FORMATIONS

John Jay Jakosky, Los Angeles, Calif.

Application July 21, 1936, Serial No. 91,708

20 Claims. (Cl. 175—182)

This invention relates to a method and apparatus for determining the nature or characteristics of the geologic formations of the sub-surface and pertains more particularly to the determination of the electrical anisotropic properties, or the degree of anisotropy, of geologic formations traversed by a drill hole.

It has been found that in stratified sections the various strata show a marked difference in conductivity or other electrical characteristics as measured substantially along or parallel to the bedding planes, and as measured substantially perpendicular or transverse thereto. For example, the greatest conductivity in such stratified sections is in general manifested in a direction parallel to the bedding planes. Furthermore, it has been found that in recent poorly stratified sections and conglomerates these anisotropic properties are not so pronounced. I have found that by taking electrical measurements to determine an electrical characteristic of a formation in a direction substantially parallel to or along the bedding planes of the strata adjacent the drill hole, and taking other electrical measurements to determine an electrical characteristic of the formation in a direction substantially perpendicular or transverse to such bedding planes, I am able to obtain valuable information relative to the nature or characteristics of the geologic formations traversed by such a drill hole.

The principal object of the invention is to provide an advantageous electrical method and apparatus for determining the nature or characteristics of the geologic formations traversed by a drill hole.

Another object of the invention is to provide an advantageous electrical method and apparatus for determining the nature of the geologic formations traversed by a drill hole by determining the electrical anisotropic properties of such formations.

A further object of the invention is to provide an electrical method and apparatus for the above purposes, which may be employed in connection with either a cased or uncased drill hole.

Another object of the invention is to provide an electrical method and apparatus for determining the nature of the stratigraphic formation traversed by a drill hole by passing electric currents, direct or alternating of high or low frequency, through such strata and determining the electrical anisotropic properties thereof.

Another object of the invention is to provide a method and apparatus for determining the nature of the stratigraphic formation traversed by a drill hole by taking a series of electrical measurements in a direction substantially parallel to the bedding planes of such strata and at different depths and another series of measurements in a direction substantially perpendicular or transverse to said bedding planes and at said different depths, and determining the nature of different sections of such formation from the anisotropic properties so determined.

According to the present invention an electric current is passed through the strata adjacent a drill hole and two measurements or series of measurements are made to determine the electrical characteristics of the strata, one measurement or series of measurements being made along or substantially parallel to the bedding planes and another measurement or series of measurements being made transverse or substantially perpendicular to the bedding planes.

The method of the present invention and certain forms of apparatus which may advantageously be employed in carrying out said method are illustrated in the accompanying drawing and referring thereto:

Figure 1:
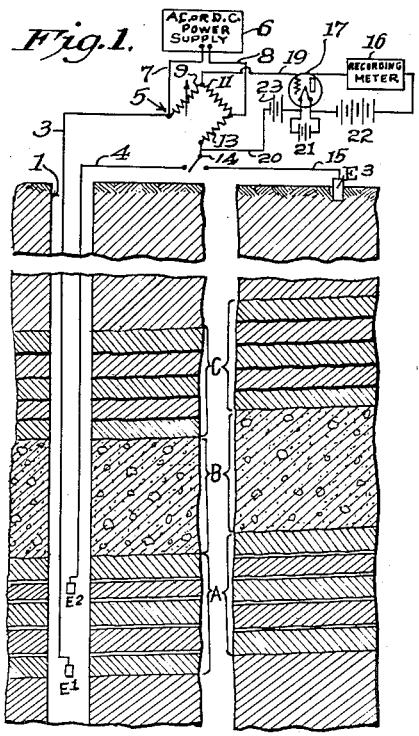
Fig. 1 is a diagrammatic view of a portion of the sub-surface adjacent a drill hole, showing electrodes and associated electrical energizing and measuring apparatus according to my invention.

Referring to Fig. 1, a drill hole 1, either cased or uncased, is shown extending through a series of geological formations, in which the section A may represent the usual bedded section with water filling the pores and stratification planes, the section B may represent a poorly stratified conglomerate section and the section C may represent a well-defined stratigraphic section containing oil, with, for example, the major portion of the oil lying along the bedding planes.

Electrodes $E_1$ and $E_2$ are shown suitably positioned within the drill hole, spaced vertically from one another, and connected through insulated conductors 3 and 4 respectively to a suitable electrical energizing and measuring means indicated generally at 5. Said energizing and measuring means may comprise, in general, a suitable electric power supply means 6 connected through conductors 7 and 8 to a suitable network of resistors 9, 11, and 13, and through a single-pole double-throw switch 14, either through the conductors 3 and 4 to the two vertically spaced electrodes $E_1$ and $E_2$ within the drill hole, or through conductor 3 to an electrode $E_1$ within the drill hole and through conductor 15 to a distant electrode $E_3$ connected to the earth at a position removed from the drill hole, for example, at the earth's surface. The power supply means 6 may be either direct current, or alternating current of any desired frequency, either high or low. The combination of resistors 9, 11, and 13 and the circuits through either the electrodes $E_1$ and $E_2$ or the electrodes $E_1$ and $E_3$ constitute the four arms of a simple bridge circuit, the arm 9 being conveniently made variable for reasons subsequently brought out. Any suitable measuring circuit may be associated with said four-arm bridge circuit, such as, for example, a recording meter 16 in the plate circuit of an amplifier tube 17 which has an input circuit connected through conductors 19 and 20 to said bridge. Suitable operating potentials and current for the tube 17 may be supplied from suitable power supply means, such as, for example, A, B, and C batteries shown at 21, 22, and 23.

It will be apparent that when the switch 14 is connected to the conductor 4 and thence to electrode $E_2$, the current flow between the electrodes $E_1$ and $E_2$ will be principally through the fluid in the drill hole and the adjacent portions of the formation, and the greater portion of such current flow within the formation will be in a direction transverse or substantially perpendicular to the bedding planes of the strata within the region adjacent said electrodes, so that measurements obtained by the recording meter 16 will be dependent upon the electrical characteristics of such strata in said direction, as is the case in my U. S. Patent No. 2,038,046, issued April 21, 1936. On the other hand, when the switch 14 is connected to conductor 15 and thence to electrode $E_3$, it will be apparent that the current flow between electrodes $E_1$ and $E_3$ will be principally through the portion of the sub-surface between said electrodes and that, due to the greater electrical conductivity along the strata than perpendicular thereto, the path of the major portion of such current will extend from the electrode $E_1$ along the bedding planes of the strata and then gradually curve upwardly along and across the strata to the electrode $E_3$. Hence, measurements obtained by the recording meter 16 under these conditions will be primarily indicative of the electrical characteristics of the strata adjacent the drill hole, in a direction substantially along or parallel to the bedding planes, as is more fully described in my pending U. S. application Serial No. 55,600.

In practicing the method of my invention with the circuit arrangement above described, the electrodes $E_1$ and $E_2$ may be lowered into the drill hole a sufficient distance to be completely immersed in the aqueous drilling fluid, or natural ground water within said hole, the switch 14 being in the proper position to energize electrodes $E_1$ and $E_2$, and the resistor 9 may then be adjusted so as to provide a desired reading on the recording meter 16. It will be appreciated that the electrodes $E_1$ and $E_2$ may be of any suitable type, although I have found electrodes of the type disclosed in my above-mentioned Patent No. 2,038,046 and co-pending application Serial No. 55,600 to be particularly advantageous. The electrodes $E_1$ and $E_2$ may then be lowered together in fixed spacial relationship, preferably continuously, and a series of measurements obtained, indicating variations in the electrical characteristics of the formations in a direction transverse or substantially perpendicular to the bedding planes, at different depths throughout the entire depth of the hole or any desired portion thereof. Using the circuit arrangement shown, these measurements will be continuously recorded on the recording meter 16.

After logging the bore-hole as above described, to obtain a record of electrical measurements taken in a direction perpendicular to the strata, the switch 14 may be thrown to a position connecting the electrode $E_3$ and disconnecting the electrode $E_2$. The advantages of a distant electrode $E_3$ located at a distance from the bore-hole preferably greater than one-third of the depth to which the survey is to be carried, have been brought out in my above-mentioned co-pending application. The resistor 9 may, if desired, be re-adjusted to provide a convenient deflection of the recording meter 16, and the bore-hole may then be logged, preferably continuously, as the electrode $E_1$ is raised from within the bore-hole to obtain another series of measurements indicating variations in the electrical characteristics of the formations in a direction substantially along or parallel to the bedding planes, at different depths, such measurements being again recorded on the recording meter 16.

It will be understood that the measurement made transverse or parallel to the bedding planes, may be made either on the descent or ascent, but it is usually more convenient and economical to make one measurement on the descent and the other measurement on the ascent.

If direct current is employed, the readings obtained will be a function of the resistance of the formations adjacent the drill hole, in the respective directions and at different depths, while if alternating current is employed, the readings obtained will be a function of the impedance of such formations, in the respective directions and at different depths. Broadly, it may be said that the measurements serve to indicate variations in conductivity of the formations, the term "conductivity" being considered herein as including either straight conductance (the reciprocal of resistance) in the case of direct current, or admittance (the reciprocal of impedance) in the case of alternating current.

It will also be apparent that measurements may be made to determine the phase shift between current and potential, when alternating current is supplied between two electrodes, and the potential measured between two auxiliary electrodes.

It will be appreciated that either direct current or alternating current of either high or low frequency may be used on the ascent or descent of the electrodes, and that I may use either the same type of current for both ascent and descent or different types and magnitudes of current for ascent and descent. However, I find it advantageous to use the same type of current both for ascent and descent and to make a continuous record of the readings obtained, preferably superimposing one record over the other. This superimposition may be conveniently accomplished by utilizing the same recording medium both for ascent and descent and recording both series of measurements thereon at the same relative positions with respect to depth, the relative position of the two recorded electrical values being conveniently adjusted by adjusting the bridge arm 9 or by other means that would be apparent to those skilled in the art. It will also be appreciated that it is immaterial whether the measurements of electrical properties perpendicular or parallel to the strata be taken upon ascent or descent of the bore-hole and furthermore, it is obvious that a suitable commutator attachment may be used in lieu of the switch 14, whereby alternate readings may be had of the electrical properties of the hole in both the directions parallel and perpendicular to the bedding planes, either upon ascent or descent of the electrodes $E_1$ and $E_2$ within the drill hole.

Upon careful analysis of the records obtained, it will be found that certain portions of the bore-hole may exhibit different electrical characteristics when measured parallel to the strata and perpendicular thereto, that is, they exhibit anisotropic properties. For example, the strata A may evidence a greater electrical conductance when measured along the bedding planes than perpendicular thereto, even though the bedding planes may be filled with connate salt-impregnated waters, and the drilling fluid of the bore-hole may have a resistivity only slightly greater than that of said connate waters. It will be appreciated, of course, that the anisotropic properties of such strata will vary to a certain extent with the impregnation of the drilling fluid into the planes of stratification; however, such impregnation will not ordinarily mask the anisotropic properties thereof because the distance between electrodes $E_1$ and $E_2$ is maintained sufficiently great to give a distance of penetration into the strata greater than the infiltration of drilling fluid into the strata. For example, the distance between said electrodes may be from 10 to 50 feet, giving an effective penetration of from 3 to 20 feet. The anisotropic properties of strata of the aqueous impregnated type indicated at A will in general be completely discernible over strata of the type indicated at C which may represent a well stratified section with oil filling the spaces between the bedding planes. In general, the electrical properties of such sections as A will be highly anisotropic and will exhibit, for example, higher values of electrical conductivities in a direction parallel to the bedding planes. High frequency measurements in sections such as C, however, will give high anisotropic properties due to the dielectric properties of the oil in the bedding planes.

Conglomerate sections as indicated at B will in general exhibit poor anisotropic or substantially isotropic properties and are often found to be oil-bearing. Gas is often present in the bedding planes and will in general tend to increase the anisotropic properties of such sections.

Figure 2:
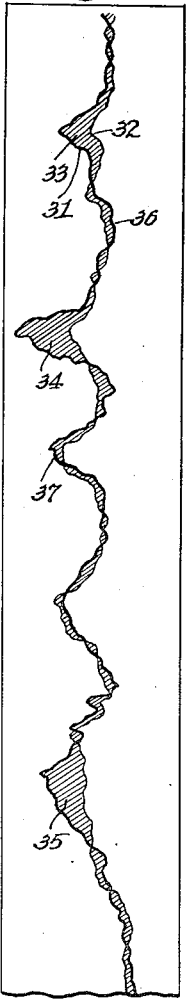
Fig. 2 is an illustrative reproduction of a chart showing two different series of measurements obtained by the method herein described.

As an illustration, Fig. 2 represents a portion of a chart such as may be obtained by superimposing the two recordings of the two series of measurements on the same recording medium, on which the depth is plotted vertically and the electrical measurements are plotted horizontally. The curve 31, for example, may represent the measurements in a direction transverse to the bedding planes, while the curve 32 may represent the measurements in a direction along the bedding planes. A convenient means of indicating on the chart the location of anisotropic sections of the formation is by shading the area between the two curves, as shown in Fig. 2. Where the curves are of generally comparable shape, the width of this shaded area will be relatively small, indicating that the corresponding portions of the formation are substantially isotropic or have relatively poorly defined anisotropic properties. Where the shaded area broadens out, however, due to marked disconformities in the two curves, as at the regions marked 33, 34, and 35, it indicates that the sections of the strata at the depths corresponding to these regions are anisotropic, the degree of anisotropy of the several sections being indicated approximately by the width, and the vertical extent of such sections being indicated approximately by the length, of these enlarged shaded areas. The portions of the curves at 36 and 37 represent sections which may be considered as isotropic or of poor anisotropic properties, but of respectively different conductivities.

It will be appreciated that the type of measuring and energizing means, the measuring and energizing procedure, and the types of measurements taken may be modified materially without departing from the spirit of the invention. For example, referring to Fig. 3, vertically spaced power or energizing electrodes $P_1$ and $P_2$ and separate vertically spaced measuring electrodes $E_1$ and $E_2$ are shown disposed in a drill hole 41, comparable to the drill hole 1, and an energizing means or power source S and an electrical measuring means M are shown connected to the electrodes $P_1$ and $E_1$ respectively through suitable insulated conductors, and adapted for connection through switches 42 and 43 and suitable insulated conductors either to electrodes $P_2$ and $E_2$ or to distant grounded electrodes $P_3$ and $E_3$. It will be understood that electrodes $P_1$ and $E_1$ are preferably maintained relatively close together, as are also electrodes $P_2$ and $E_2$, and $P_3$ and $E_3$ respectively.

In order to obtain a series of measurements of the electrical properties of the strata adjacent the drill hole in a direction transverse to the strata, the switches 42 and 43 may be connected to electrodes $P_2$ and $E_2$ respectively, and the electrodes $P_1$ and $P_2$ may be energized by current from the source S which may, for example, be a constant potential source of either alternating or direct current. Measurements may be obtained at the measuring means M which may, for example, be a current recording meter. The spacial relation between the electrodes $E_1$, $E_2$, $P_1$, and $P_2$ is preferably maintained substantially uniform while moving the entire electrode system to different depths within the drill hole. The measurements at M will vary in accordance with variations in the potential between electrodes $E_1$ and $E_2$.

A series of measurements substantially parallel to the bedding planes of the strata may then be obtained, for example, by operating switches 42 and 43 to connect the power source S to electrodes $P_3$ and $P_1$ and the measuring means M to electrodes $E_3$ and $E_1$, passing an electric current between $P_3$ and $P_1$, and recording measurements at M indicative of variations in potential between $E_3$ and $E_1$, preferably while traversing the drill hole with the electrodes $E_1$ and $P_1$ maintained in a substantially fixed spacial relation to one another.

It will be appreciated that when the measuring means M is connected between $E_1$ and $E_3$ and the electric power source S is connected between $P_1$ and $P_3$ satisfactory measurements may be obtained by incorporating $E_3$ and $P_3$ or $E_1$ and $P_1$ into a common electrode, or when measurements are being taken between measuring electrodes $E_1$ and $E_2$ and energy is being supplied between energizing electrodes $P_1$ and $P_2$ either one of the measuring electrodes may be combined with the adjacent energizing electrodes to form a common electrode, so that measurements may be taken between the common electrode and the remaining measuring electrode and energy may be supplied between the common electrode and the remaining energizing electrode.

It is also possible to pass an electrical current between the electrode $P_1$ and the distant electrode $P_3$, and to take measurements between electrodes $E_1$ and $E_2$ within the hole; however, such measurements will be dependent in part upon the electrical characteristics of the strata along the bedding planes and in part upon the electrical characteristics transverse to the bedding planes, and will therefore be generally of less significance than when the energizing and measuring electrodes are disposed in the same relative position with respect to the formation.

It may be advantageous in some instances to obtain data relative to the capacity or dielectric properties of the strata and such data may be obtained by observing the phase angle or phase shift of the current relative to the voltage between the measuring electrodes. This may be accomplished in several ways; for example, referring to Fig. 4, a suitable alternating current source, preferably a constant potential source, is indicated at 52, connected to the terminals of a bridge having three resistance arms 53, 54, and 55, and a fourth arm having a variable capacity 56. Electrodes $E_1$ and $E_2$ are shown positioned within a drill hole 51, comparable to the drill hole 1 in Fig. 1, and connected to the bridge through suitable insulated conductors, the electrode $E_1$ being connected directly to the bridge and the electrode $E_2$ being connected through a switch 57 to the bridge at one side of the condenser 56. A distant grounded electrode $E_3$ may also be connected to the condenser 56 by throwing the switch 57 and disconnecting the electrode $E_2$ after the manner of the switch 14 in Fig. 1. I have shown in dotted lines the equivalent resistance R, capacity C and inductance L reflected in the fourth bridge arm by the external electrode circuit either from $E_1$ to $E_2$ or from $E_1$ to $E_3$, dependent upon the position of the switch 57. A condition of balance in the bridge may be obtained by adjusting the resistance arm 53 and the capacity 56 in the fourth arm, this condition being denoted by the deflection of a galvanometer G as will be apparent to those skilled in the art. At the condition of balance the potential as measured across the resistor 53 will be in phase with the potential measured across the fourth arm of the bridge due to the cancelation of the inductive reactance of the leads by the capacity reactance due to the earth's formation and the capacity reactance of the condenser 56, such phase relation being readily indicated or recorded by an indicating or recording oscillograph 58 having an element 61 connected across the resistor 53 and an element 62 connected across the fourth arm of the bridge.

The electrode system may traverse the drill hole in any of the manners described in relation to Fig. 1 and records are made of the two oscillograph elements to determine the phase shift. A set of phase angle readings at different depths may be taken while measuring in a direction substantially transverse to the bedding planes and another set may be taken transverse thereto and the two sets of readings may be compared and the anisotropic properties of the strata determined at the different depths.

It will be appreciated that it may not be practicable to make continuous records on the oscillograph as the electrodes traverse the drill hole due to the bulk of the record that would result; therefore it may be advantageous to take short records at different depths. Single readings may also be made by taking one reading transverse to the strata and another reading parallel thereto while the electrodes are at rest at each depth.

In my Patent No. 2,038,046 I have described a method and apparatus for taking measurements of such electrical characteristics as impedance, conductance, specific dielectric constant and dielectric properties; and for measuring in circuits including an elementary portion of the earth, the potential, current, phase angle, capacitance, and alternating current power losses, all of these determinations being made in a direction substantially transverse or perpendicular to the bedding planes of the strata. In my pending application Serial No. 55,600 I have described a method and apparatus for determining electrical properties and characteristics of circuits including an elementary portion of the earth of the type referred to in the above-mentioned patent in a direction substantially parallel or along the bedding plane of the strata. It will be understood that the methods and apparatus described in said patent and patent application and the electrical characteristics and electrical values measured are applicable in general to the present invention.

It has been found while taking measurements transverse to the strata that if the electrodes $E_1$ and $E_2$, for example in Fig. 1, are of comparable size and are of short length as compared to the thickness of the strata, changes in the electrical characteristics of the circuit due to the different strata encountered as the electrodes traverse the bore-hole will in general be manifested twice, once when the particular strata are encountered by the electrode $E_1$, again when the same strata are encountered by the electrode $E_2$. Although allowance may be made for this double manifestation of the electrical characteristics in the interpretation of the data, it usually is advantageous to provide means for obtaining a single well defined manifestation of the electrical characteristics of the strata as they are encountered by one electrode and a much less pronounced manifestation as the same strata are encountered by the second electrode. With this end in view, it is advantageous to employ one measuring electrode of relatively small vertical length, which serves as an exploring electrode, and another electrode of relatively great vertical length, which serves as an opposing electrode but whose length is sufficient to overlap different strata and prevent any significant changes in the measured characteristics of the circuit as the last-mentioned electrode encounters different strata.

Figures 5, 6:
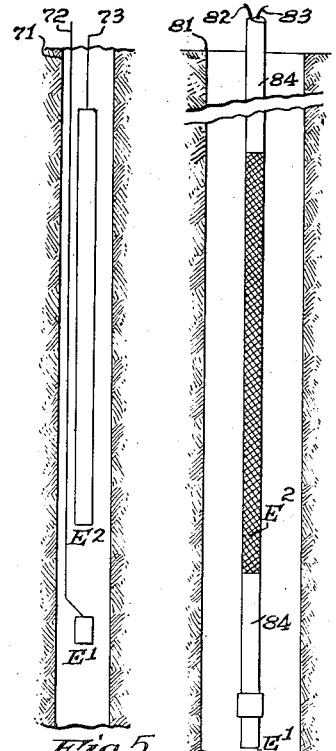
Fig. 5 is a diagrammatic view of a portion of a drill hole showing an electrode system which is useful in taking measurements perpendicular to the bedding planes of the strata.
Fig. 6 is a view corresponding to Fig. 5 illustrating a further modification of the electrode system.

For example, referring to Fig. 5, a drill hole 71 is shown extending through a stratified section and electrodes $E_1$ and $E_2$ are positioned within the drill hole and adapted for connection to electrical measuring and energizing apparatus through the agency of suitable insulated conductors 72 and 73 respectively. It has been found that it is advantageous to make the length of one of the electrodes, such as $E_2$, relatively great with respect to the thickness of the strata, for example fifty feet or more in length, and to space the relatively short exploring electrode $E_1$ from the electrode $E_2$ by a distance sufficient to provide the desired penetration of current into the strata, for example about twenty-five feet. The distance between the two electrodes may advantageously be less than the length of the long electrode $E_2$. The exploring electrode should have a length sufficient to provide an adequate surface of contact with the liquid medium in the bore-hole, but relatively small as compared to the thickness of the strata, for example, about one-half to one foot, and one to two inches in diameter.

In Fig. 6 I have illustrated an advantageous form of such an electrode system and referring thereto, a short exploring electrode $E_1$ and an extended electrode $E_2$ are positioned within a drill hole 81 through the agency of a cable comprising suitable conductors 82 and 83 insulated from each other and surrounded with an insulated sheath 84, the conductors 82 and 83 being connected electrically to the electrodes $E_1$ and $E_2$ respectively. The electrode $E_1$ may be formed in any suitable manner, for example, as a metallic member of suitable dimensions secured to the lower end of the cable, and the electrode $E$ may comprise a braided wire sheath, a wire armor, or other exposed sleeve or surface layer of conducting material disposed about the insulating sheath 84 for a suitable distance and connected by a suitable conductor to the conductor 83. In some cases, particularly when operating in cased holes, it will be advantageous to provide an open-ended insulated shield over the relatively short exploring electrode $E_1$ as described in my pending application Serial No. 55,600.

Figure 3:
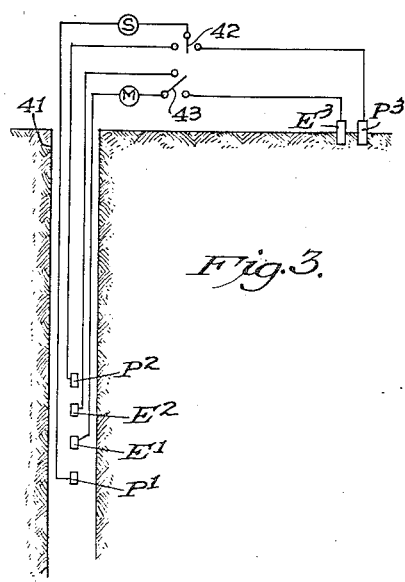
Fig 3 is a diagrammatic view corresponding to Fig. 1 showing certain modified arrangements of electrodes which may be employed in accordance with the invention.
Figure 4:
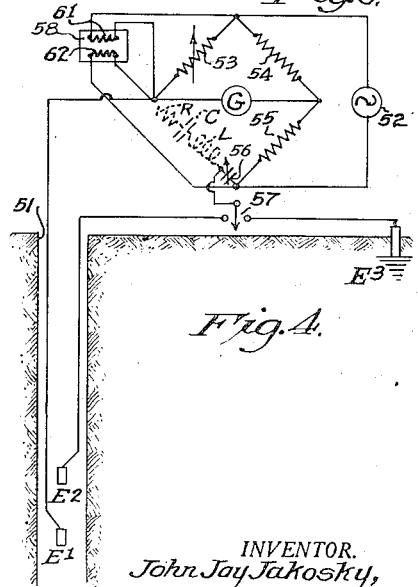
Fig. 4 is a wiring diagram of an electrical circuit which may be used to obtain phase angle measurements.

It will be understood that the measuring electrode system shown in Figs. 5 and 6 may be used in conjunction with any of the electrical circuit arrangements shown in Figs. 1, 3, or 4. Furthermore, it will be understood that separate energizing electrodes $P_1$, $P_2$, and $P_3$ and measuring electrodes $E_1$, $E_2$, and $E_3$, as shown in Fig. 3, may be employed in conjunction with either of the energizing and measuring circuits shown in Figs. 1 and 4.

I claim:

1. The method of determining the nature of geologic formations which comprises: taking electrical measurements to determine an electrical characteristic of a formation in a direction substantially parallel to the bedding planes of the strata therein; and taking other electrical measurements to determine a comparable electrical characteristic of said formation in a direction transverse to the bedding planes of said strata, whereby the degree of anisotropy of said formation may be determined by comparing the measurements so obtained.

2. The method of determining the nature of a geologic formation adjacent a drill hole which comprises: passing an electric current through said formation and taking an electrical measurement indicative of a characteristic of said formation in a direction substantially parallel to the bedding planes of the strata; and passing an electric current through said formation and taking an electrical measurement indicative of a comparable characteristic of said formation in a direction transverse to the bedding planes of said strata, whereby the degree of anisotropy of said formation may be determined by comparing the measurements so obtained.

3. The method of determining the nature of the geologic formations adjacent a drill hole which comprises: taking a series of electrical measurements to determine an electrical characteristic of the strata adjacent said drill hole, at different depths and in a direction substantially parallel to the bedding planes of the strata; and taking another series of electrical measurements to determine a comparable electrical characteristic of said strata at said different depths and in a direction substantially perpendicular to the bedding planes of said strata, whereby the degree of anisotropy of said formation may be determined by comparing the two measurements so obtained at each of said depths.

4. The method of determining the nature of the geologic formation adjacent a drill hole which comprises: passing an electric current through the strata adjacent said drill hole and measuring an electrical characteristic of said strata at different depths and in a direction substantially parallel to the bedding planes of the strata; and passing an electric current through said strata and measuring a comparable electrical characteristic of said strata at different depths and in a direction transverse to the bedding planes of said strata, whereby the degree of anisotropy of said formation may be determined by comparing the two measurements so obtained at the different depths.

5. The method of determining the nature of the geologic formation adjacent a drill hole which comprises: passing an electric current through said formation between an electrode at a known depth within said drill hole and an electrode at the earth's surface removed from the drill hole, and measuring an electrical characteristic of the formation traversed by said current between said electrodes; and passing an electric current through said formation between two spaced electrodes within said drill hole adjacent said known depth, and measuring a comparable electrical characteristic of the formation traversed by said current between the last-named two electrodes, whereby the degree of anisotropy of said formation may be determined by comparing the measurements so obtained.

6. The method as set forth in claim 5, in which the first-mentioned electrode within the drill hole is also employed as one of the two last-mentioned electrodes.

7. The method of determining the nature of the geologic formation adjacent a drill hole which comprises: passing an electric current through said formation between an electrode within said drill hole and another electrode connected to the earth at a position removed from said drill hole, moving the first electrode to different depths within the drill hole, and measuring variations in an electrical characteristic of the formation traversed by the current flowing between said electrodes as said first electrode is moved to different depths; and passing an electric current through said formation between two spaced electrodes within said drill hole, moving the last-named electrodes to positions adjacent each of said different depths, and measuring variations in a comparable electrical characteristic of the formation traversed by the current flowing between said last-named electrodes as said last-named electrodes are moved to different depths, whereby the degree of anisotropy of said formation may be determined by comparing the two sets of measurements so obtained.

8. The method of determining the nature of a geologic formation which comprises: taking electrical measurements to determine the conductivity of the formation adjacent a drill hole in a direction substantially parallel to the bedding planes of the strata; and taking other electrical measurements to determine the conductivity of said formation in a direction transverse to the bedding planes of said strata, whereby the degree of anisotropy of said formation may be determined by comparing the measurements so obtained.

9. The method of determining the nature of a geologic formation which comprises: taking electrical measurements to determine the dielectric properties of a formation adjacent a drill hole in a direction substantially parallel to the bedding planes of the strata therein; and taking other electrical measurements to determine the dielectric properties of said formation in a direction transverse to the bedding planes of said strata, whereby the degree of anisotropy of said formation may be determined by comparing the measurements so obtained.

10. The method of determining the nature of a geologic formation adjacent a drill hole which comprises: taking a series of electrical measurements to determine variations in the electrical conductivity of the strata adjacent said drill hole, at different depths and in a direction substantially parallel to the bedding planes of the strata; and taking another series of electrical measurements to determine variations in the electrical conductivity of said strata at said different depths and in a direction substantially perpendicular to the bedding planes of said strata, whereby the degree of anisotropy of said formation may be determined by comparing the measurements so obtained at each of said depths.

11. The method of determining the nature of a geologic formation adjacent a drill hole which comprises: taking a series of electrical measurements to determine variations in the dielectric properties of the strata adjacent said drill hole, at different depths and in a direction substantially parallel to the bedding planes of the strata; and taking another series of electrical measurements to determine variations in the dielectric properties of said strata at said different depths and in a direction substantially perpendicular to the bedding planes of said strata, whereby the degree of anisotropy of said formation may be determined by comparing the two measurements so obtained at each of said depths.

12. The method of determining the nature of a geologic formation adjacent a drill hole which comprises: passing an alternating current through said formation between an electrode at a known depth within said drill hole and an electrode at the earth's surface removed from the drill hole, and measuring the impedance of the formation traversed by said current between said electrodes; and passing an alternating current through said formation between two spaced electrodes within said drill hole adjacent said known depth, and measuring the impedance of the formation traversed by said current between the last-named two electrodes, whereby the degree of anisotropy of said formation may be determined by comparing the measurements so obtained.

13. The method of determining the nature of a geologic formation adjacent a drill hole which comprises: passing an alternating current through said formation between an electrode at a known depth within said drill hole and an electrode at the earth's surface removed from the drill hole, and measuring the phase angle of the current between said electrodes; and passing an electric current through said formation between two spaced electrodes within said drill hole adjacent said known depth, and measuring the phase angle of the current between said last-named two electrodes, whereby the degree of anisotropy of said formation may be determined by comparing the measurements so obtained.

14. The method as set forth in claim 13, in which said phase angle measurements are each repeated at a plurality of different depths within the bore-hole.

15. An apparatus for use in determining the nature of a geologic formation which comprises: two vertically spaced electrodes disposed within a drill hole; another electrode connected to the earth at a position removed from said drill hole; an electric circuit associated with said electrodes and including a source of electric current and switching means operable to one position to connect said source of current to said two electrodes within the drill hole, and to another position to connect said source of current to one of said electrodes within the drill hole and to said other electrode; means for moving the two first-mentioned electrodes to different depths within said hole; and electrical measuring means associated with said circuit for measuring variations in an electrical characteristic of the current path between said electrodes.

16. An apparatus as set forth in claim 15, in which said measuring means comprises a device adapted to measure variations in conductivity of the current path between the electrodes.

17. An apparatus as set forth in claim 15, in which said current source is a source of alternating current and said measuring means comprises a device for measuring variations in the dielectric value of the current path between said electrodes.

18. An apparatus as set forth in claim 15, in which said current source is a source of alternating current and said measuring means comprises a device for measuring variations in the capacity of the current path between the electrodes.

19. In an apparatus for use in determining the nature of geologic formation adjacent a drill hole, the combination which comprises: an electrode of relatively small vertical length as compared to the thickness of the strata; a second electrode of relatively great vertical length in comparison to the thickness of said strata; said electrodes being vertically spaced from one another; and an electrical measuring circuit connected to said electrodes.

20. In an apparatus for use in determining the nature of geologic formation adjacent a drill hole, the combination which comprises: an electrode of relatively small vertical length; a second electrode vertically spaced from the first-mentioned electrode and having a vertical length greater than the distance between said electrodes; and an electrical measuring circuit connected to said electrodes.

JOHN JAY JAKOSKY.